US012703783B2

(12) United States Patent
Kallel et al.

(10) Patent No.: US 12,703,783 B2
(45) Date of Patent: Aug. 11, 2026

(54) MATERIAL FOR A POLYSTYRENE-BASED FOOD PACKAGING AND PREPARATION METHOD

(71) Applicant: SIAMP CEDAP, Monaco (MC)

(72) Inventors: Achraf Kallel, Nice (FR); Giampaolo Guerani, Viterbo (IT); Vincent Chaupin, Cagnes-sur-Mer (FR)

(73) Assignee: SIAMP CEDAP REUNIES, Monaco (MC)

( * ) Notice: Subject to any disclaimer, the term of this patent is extended or adjusted under 35 U.S.C. 154(b) by 829 days.

(21) Appl. No.: 17/904,985

(22) PCT Filed: Feb. 26, 2021

(86) PCT No.: PCT/EP2021/054783
§ 371 (c)(1),
(2) Date: Aug. 25, 2022

(87) PCT Pub. No.: WO2021/170776
PCT Pub. Date: Sep. 2, 2021

(65) Prior Publication Data

US 2023/0114257 A1 Apr. 13, 2023

(30) Foreign Application Priority Data

Feb. 27, 2020 (FR) .......................................... 2001927

(51) Int. Cl.
*C08K 3/34* (2006.01)
*C08F 112/08* (2006.01)
*C08K 7/26* (2006.01)

(52) U.S. Cl.
CPC ............ *C08K 3/346* (2013.01); *C08F 112/08* (2013.01); *C08K 7/26* (2013.01)

(58) Field of Classification Search
CPC .......... C08K 3/346; C08K 7/26; C08F 112/08
See application file for complete search history.

(56) References Cited

U.S. PATENT DOCUMENTS

2006/0163160 A1* 7/2006 Weiner ................. B01D 63/088 106/632
2007/0106006 A1 5/2007 Cooper et al.
2008/0262126 A1* 10/2008 Fleischer ................. C08J 3/205 523/351

FOREIGN PATENT DOCUMENTS

EP 2965623 A1 1/2016
WO WO-9015095 A1 * 12/1990 ............ C08L 51/003
WO 2004012998 A2 2/2004

OTHER PUBLICATIONS

Abolghasemi-Fakhri et al, Styrene monomer migration from polystyrene based food packaging nanocomposite: Effect of clay and ZnO nanoparticles, Jul. 2019, Food and Chemical Toxicology, vol. 129, p. 77-86 (Year: 2019).*
Yuan et al, Properties and applications of halloysite nanotubes: recent research advances and future prospects, 2015, Applied Clay Science, vol. 112-113, p. 75-93 (Year: 2015).*
Szpilska et al, Halloysite nanotubes as polyolefin fillers, 2015, Polimery, vol. 60, Issue 6, p. 359-371. (Year: 2015).*
Gaikwad et al, Ethylene scavengers for active packaging of fresh food produce, 2020, Environmental Chemistry Letters, vol. 18, p. 269-284 (Year: 2020).*
Tas et al, Halloysite Nanotubes/Polyethylene Nanocomposites for Active Food Packaging Materials with Ethylene Scavenging and Gas Barrier Properties, 2017, Food Bioprocess Technology, vol. 10, p. 789-798 (Year: 2017).*
Genualdi et al, Updated evaluation of the migration of styrene monomer and oligomers from polystyrene food contact materials to foods and food simulants, 2014, Food Additives & Contaminants: Part A, 31(4), 723-733. (Year: 2014).*
International Search Report issued May 11, 2021 re: Application No. PCT/EP2021/054783, pp. 1-3, citing: U.S. Pat. No. 2007106006 A1, EP 2965623 A1, Makaremi et al. "Effect of Morphology . . . ", Zhao et al. "Hallysite nanotubes/polystyrene . . . ".
M. Zhao et al., "Halloysite nanotubes/polystyrene (HNTs/PS) nanocomposites via in situ bulk polymerization", Journal of Thermal Analysis and Calorimetry, Aug. 12, 2008, vol. 94, No. 1, pp. 103-107, XP019646282.
Maziyar Makaremi et al., "Effect of Morphology and Size of Halloysite Nanotubes on Functional Pectin Bionanocomposites for Food Packaging Applications", ACS Applied Materials & Interfaces, May 15, 2017, vol. 9, No. 20, pp. 17476-17488, XP055739956.

* cited by examiner

*Primary Examiner* — Mark Eashoo
*Assistant Examiner* — Caitlin Norine Illing
(74) *Attorney, Agent, or Firm* — Oliff PLC

(57) ABSTRACT

A material for food packaging, includes a polystyrene and 0.1 to 50% by weight of a halloysite essentially in the form of empty nanotubes, relative to the weight of the material, a method for preparing such a material, as well as the applications of this material, in particular for the manufacture of a food packaging.

12 Claims, No Drawings

MATERIAL FOR A POLYSTYRENE-BASED FOOD PACKAGING AND PREPARATION METHOD

TECHNICAL FIELD

The disclosure concerns the field of packaging and more specifically food packaging.

BACKGROUND

Most of packaging plastics are manufactured from a small number of monomers, five polymers alone representing 90% of the market, including polystyrene (PS). This styrene polymer is widely used in packaging, particularly in dairy product packaging (yogurts, fresh cream, milk desserts). Due to a good strength/lightness ratio, it is also involved in expanded form (EPS) in the manufacture of trays intended for packaging of solid food products such as meat, seafood and cheese.

While polystyrene is considered stable and inert under handling and storage conditions at room temperature or at lower temperatures, and non-chemically toxic, styrene however presents a high carcinogenic risk. Despite its stability, polystyrene inevitably releases styrene units which bind in the food product and which are therefore ingested by the consumer. As soon as it is subjected to heat, this phenomenon of migration accelerates, causing an excessive release of styrene present in the food in potentially toxic contents. Styrene dimers and trimers are also suspected of noxiousness, as endocrine disruptors.

Solutions have been suggested to overcome this drawback. Thus, the document WO2004/012998A2 describes a material for a polystyrene-based food packaging, comprising clay nanoparticles preferably selected from montmorillonites and zirconium and titanium phosphonites, which allow slowing down the migration of monomers and styrene di- and tri-mers to the contents in contact with said material.

However, the existing solutions to date to limit this emission of monomers and oligomers are still insufficiently effective.

SUMMARY

The disclosure therefore provides a solution which allows solving this problem, by considerably limiting, and possibly inhibiting, the release of styrene, as well as of its dimers and trimers, by the polystyrene, while being simple to implement, without adding any drawback.

According to the disclosure, a polystyrene-based material which comprises an aluminosilicate is provided. This aluminosilicate consists of a halloysite.

The use of clays is known in the manufacture of polymer materials, the addition of clays allowing conferring on these materials better properties and/or properties adapted to their use.

Thus, the document US2007/106006A1 discloses a material comprising a polymer which may be, inter alia, a polystyrene, and a nanotubular halloysite in a proportion of 1-20% by weight, to improve the mechanical and thermal properties of the polymer, in particular by functionalizing the halloysite tubes with appropriate agents. The authors have demonstrated an increase in the tensile strength for polyamide and a rise in the decomposition temperature for polypropylene. However, no test has been carried out on polystyrene.

The document EP2965623A1 describes a polymer material for the manufacture of food packaging film comprising a polymer and a halloysite which has been modified to confer antibacterial properties thereon. To this end, the halloysite nanotubes are filled with essential oil-type antibacterial agents, which are then released into the environment and onto the packaged food. It has also been observed that the nanotubes that remained empty were able to absorb ethylene emitted by packaged fruits and vegetables and thus extend their shelf life. While this document refers to any polymer, including polystyrene, the targeted polymers are polyethylene and polypropylene which do not have the above-mentioned drawbacks of polystyrene.

The specific problem encountered by the use of polystyrene in terms of risk of food toxicity is therefore not satisfactorily solved, and the disclosure makes an effective contribution in solving it.

Before exposing the disclosure, some terms used in the text are defined below.

The term "food" as used in the present text, includes any edible material or any mixture of edible materials, in any form whatsoever, and in particular liquid, solid, and any intermediate state. Thus, it can be selected from a drink, a raw or cooked meat, which is possibly seasoned and/or accompanied for example by a sauce.

By styrene, it should be understood a styrene monomer; by styrene oligomers, it should be understood oligomers containing, in the absence of specification, in the range of 2 to 20 styrene units, generally in the range of 2 to 10 styrene units. The term polystyrene according to the disclosure, covers any styrene homopolymer, but also styrene copolymers mainly containing styrene units and integrating units which are not styrene units, for example butadiene, acrylonitrile and/or any other appropriate monomer units, said homopolymers and copolymers being adapted to be used for food packaging; "mainly" means that the copolymer includes, in all of the units constituting it, at least 60% of styrene units, preferably at least 75%, and possibly at least 90%. The copolymers may be of any nature, with a homogeneous structure or with a heterogeneous structure such as a graft copolymer. The term polystyrene further includes in the present text any multiphase polystyrene, that is to say any polystyrene which does not have a homogeneous composition, which comprises or consists of at least one polystyrene as defined above and another polymer which may be a polystyrene as defined above but different, or any other polymer. As examples of polystyrene as understood according to the disclosure, polystyrenes corresponding to the names GPPS for General Purpose Polystyrene and HIPS for High Impact Polystyrene can be retained.

According to the disclosure, a polystyrene as defined above can be expanded; we also talk about light polystyrene or high density polystyrene foam.

This definition of polystyrene includes any mixture of at least two polystyrenes as defined above, or more.

A polystyrene-based food packaging should be understood as a packaging whose constituent polymer is essentially a polystyrene, and possibly consists of polystyrene alone.

A halloysite refers to an aluminosilicate of formula $Al_2Si_2O_5(OH)_4 \cdot nH_2O$ in a more or less hydrated state according to the value of n which generally varies from 0 to 4, but can be higher; its structure is multilayer and the space between the layers is determined by the hydration rate of halloysite; the most common forms are the so-called hydrated halloysite of formula $Al_2Si_2O_5(OH)_4.2H_2O$ and whose spacing between the layers is 1 nm and the dehydrated halloysite of formula $Al_2Si_2O_5(OH)_4$ and whose spacing between the layers is 0.7 nm. This multilayer structure of halloysite is rolled up to define hollow tubes having a diameter smaller than 100 nm, generally in the range of 15 to 30 nm and a length in the range of 0.2 to 10 μm, more conventionally in the range of 0.2 to 2 μm.

By release or migration of a monomer or an oligomer, it should be understood the removal of said monomer or said oligomer from the polystyrene in the enclosure defined by the packaging, thereby making it likely to contaminate the packaged food or its environment.

The various aspects of the disclosure are set out below.

DETAILED DESCRIPTION OF THE DISCLOSURE

As previously indicated, an object of the disclosure relates to a material for food packaging, comprising a polystyrene and a halloysite essentially in the form of empty nanotubes, the halloysite being present in a content of 0.1 to 50% by weight relative to the weight of the material. Preferably, the halloysite content is 0.1 to 30%, and possibly 0.1 to 20%, and possibly 0.1 to 10%. Beyond the value of 50% of the halloysite content, the qualities of the packaging are altered, and below a value of 0.1%, the halloysite content is too low to prevent the migration of styrene.

As will be demonstrated later on in the examples, the inventors have identified, among several clays, the halloysite as an additive to polystyrene to overcome the aforementioned problem. Even if a mechanism could be considered, it would appear that halloysite acts by catalyzing the polymerization of styrene monomers, dimers and trimers into stable oligomers of at least 4 units, preventing the migration of said monomers, dimers and trimers; this result is completely unexpected.

By "essentially in the form of empty nanotubes", it should be understood that most of halloysite tubes are empty, or in any case that the existence of some tubes which would not be empty that could be considered as present in the form of traces, in no way affects the effectiveness of the additive of the disclosure. According to a variant of the disclosure, the halloysite of mixture a) is entirely in the form of empty nanotubes.

Said material of the disclosure is intended for food packaging, and it may include any usually used additive. Thus, it may comprise at least one or more additive(s) selected from antioxidants, colourants, pigments, mineral fillers, fibers whether natural or synthetic. Any other additive well known to those skilled in the art can be added. The proportion of each of the additives is highly variable depending on the nature and function of the additive and can easily be determined by those skilled in the art with regards to the expected properties. For illustration, the proportion of the antioxidant(s) is preferably smaller than or equal to 1% by weight relative to the weight of the material. The proportion of pigments and/or colourants can reach 20% by weight relative to the weight of the material. That of the mineral fillers and/or fibers can amount to 40%, and possibly 50% by weight relative to the weight of the material. This material may be in various forms, thus it may be in the form of a flexible film.

Another object of the disclosure relates to a food packaging comprising at least one material as defined above. By "at least", it should be understood that the food packaging may comprise two or more materials, said materials being as defined above and different. It may also comprise any other appropriate material which is compatible with the material of the disclosure. Thus, a food packaging of the disclosure may be multilayer and may comprise at least one layer of a material according to the disclosure. It may comprise or consist of several layers at least two, or more, or even all, of which are each made of a material of the disclosure, said materials of each layer may be identical or different.

The disclosure also concerns a method for preparing a polystyrene-based material for food packaging, comprising the step according to which a mixture of a polystyrene in particulate form and at least one halloysite essentially in the form of empty nanotubes is homogenized, to obtain said material.

According to a variant of such a method, it comprises the following steps of:

a) Homogenizing a mixture of a polystyrene in particulate form and at least one halloysite essentially in the form of empty nanotubes to obtain a primary mixture, and
b) Homogenizing the primary mixture a) with a polystyrene in particulate form to obtain said material.

In another aspect, the disclosure concerns a method for limiting, and possibly inhibiting, the migration of styrene from a polystyrene-based material for food packaging, this method comprising the step according to which a mixture of a polystyrene in particulate form and at least one halloysite essentially in the form of empty nanotubes is homogenized, to obtain said material.

According to a variant, the method comprises the following steps of:

a) Homogenizing a mixture of a polystyrene in particulate form and at least one halloysite essentially in the form of empty nanotubes to obtain a primary mixture, and
b) Homogenizing the primary mixture a) with a polystyrene in particulate form to obtain said material.

Implementations of the disclosure are described below, the features set out below may be considered individually or in any combination.

The halloysite according to the disclosure is favorably used in powder form. This form is commercially available. A preferred particle size distribution of the halloysite powder is as follows: d90:10.00 μm; d50:0.19 μm, d100:18 μm. Preferably, the halloysite is dried before use thereof, for example in a dryer for 2 hours at 120° C.

According to an advantageous variant, the homogenization step of a method of the disclosure, or step a) and/or step b) of the above methods is carried out in a twin-screw extruder; preferably steps a) and b) are carried out in a twin-screw extruder.

The choice of polystyrene is adapted to the food packaging and those skilled in the art have no difficulty in making it using their general knowledge. Steps a) and b) make use of particulate polystyrenes, which may be identical or different.

By particulate polystyrene in step a) and/or step b), it should be advantageously understood a polystyrene in the form of particles of which at least 95% have a size smaller than 1 cm. The homogenization of polystyrene particles with halloysite must be optimal to obtain maximum efficiency of the halloysite. And according to the variant defined above of a method of the disclosure, it is preferable that the homogenization of polystyrene particles with halloysite to obtain the primary mixture of step a) but also that the homogenization of the primary mixture with a polystyrene in step b) are as thoroughly as possible. Such particulate polystyrenes are commercially available; they can also be obtained by any grinding technique from a polystyrene for example in the form of granules.

To obtain the primary mixture, in step a), 50-99.9% by weight of polystyrene and 0.1-50% by weight of halloysite, relative to the weight of the expected final material, are mixed. In step b), 1-60% by weight of primary mixture and 40-99% by weight of polystyrene are mixed to obtain the secondary mixture.

According to the method, at least one additive can be added. These are those previously identified and optionally any other appropriate additive well known to those skilled in the art. Advantageously, the additive(s) are added in step a).

The disclosure also concerns the manufacture of a packaging of the disclosure. This comprises a step of shaping a material of the disclosure by heat treatment. It can be performed by any shaping technique such as thermoforming, injection, extrusion. Preferably, it is carried out by extrusion in a single-screw or twin-screw extruder.

In another aspect, the disclosure concerns a method for preserving food in a polystyrene-based packaging, comprising the following steps of:

- manufacturing a polystyrene-based packaging by a method of the disclosure described above, and
- packaging said food in the packaging and storing the food thus packaged under conditions adapted to said food.

Compared to conventional polystyrene-based packaging, the migration of styrene into the preserved food is substantially reduced and the risk of toxicity related thereto is thus significantly reduced, and possibly eliminated.

The disclosure also concerns the use of halloysite in the form of hollow nanotubes, to manufacture a polystyrene-based material for food packaging, with low styrene release. Advantageously, halloysite is used in the previously indicated contents.

The features and advantages of some aspects of the disclosure will appear from the examples below, which illustrate the influence of different clays on the migration of styrene from a polystyrene composition.

Example 1: Experimental Protocol

1.1) Clays

The tested clays are as follows:

① A clay of the disclosure, a Dragonite HP halloysite commercialized by APPLIED MINERALS INC and meeting the following characteristics:

chemical formulation $AlSi_2O_5(OH)_2 \cdot nH_2O$, with n ranging from 0-3

% of metal oxides by weight relative to the total weight of the composition

| | |
|---|---|
| $Na_2O$ and $K_2O$ | <0.10% |
| CaO | <0.20% |
| MgO | <0.05% |
| $Fe_2O_3$ | 0.3-1% |
| $TiO_2$ | <0.05% |
| $P_2O_5$ | <0.75%, |

nanotube morphology:

| | |
|---|---|
| length (L) | 0.2-2 μm |
| outer diameter (D) | 50-70 nm |
| inner diameter | 15-30 nm |
| with L/D | 10-20, |

cation exchange capacity (in milliequivalents per 100 g): 11, particle size distribution (μm):

| | |
|---|---|
| d90 | 10.00 |
| d50 | 0.19 |
| d10 | 0.18, |
| pH 3.7-5.0 | |

② A montmorillonite commercialized under the name "Polargel HV" by MINERAL TECHNOLOGY;

③ An attapulgite commercialized under the name "Actigel 208" by ACTIVE MINERALS;

④ A silicalite commercialized under the name "Asorbio ZSM 5" by SILKEM

⑤ A zeolite having a pore size of 13 Å commercialized under the name "Asorbio ZAP 13X" by SILKEM (zeolite having a pore size of 13 Å); and ⑥ Another zeolite having a pore size of 4 Å commercialized under the name "Zeoflair 1000" by ZEOCHEM.

1.2) Preparation of a Packaging Type Polystyrene Sample

Commercial granules of crystal polystyrene (General Purpose PolyStyrene, GPPS) of the Edistir® N 1840 type are ground until obtaining a powder less than 5% of the particles of which are larger than 1,000 μm.

The clays and zeolites are dried in a dryer for 2 hours at 120° C.

The ground GPPS is then mixed for one minute at high speed in a turbo-mixer with clays and zeolites ① to ⑥ and an antioxidant additive Irganox® 1076.

The powder mixtures thus obtained are extruded at 190° C. into pellets using a twin-screw extruder of the TSA 21-40D type so that each mixture contains 30% of mineral clay by weight in the samples 1-6. A control sample is prepared in the same way with the only difference that it does not contain clay or antioxidant.

Each of the mixtures is then combined with a mixture having a weight ratio of 50/50 of crystal polystyrene (GPPS) of the Edistir® N 1840 type and high impact polystyrene (HIPS) of the Edistir® R 850 E type, to reach a final clay or zeolite content of 3% by weight relative to the weight of the mixture.

The mixtures are then extruded at 200° C. into 800 μm thick sheets with a single-screw extruder.

Example 2: Miciration Test and Results

The sheets thus obtained are tested for the migration of styrene monomers according to the Commission Regulation (EU) No. 10/2011 of Jan. 14, 2011 on plastic materials and articles intended to come into contact with food. The foodstuff simulant D1 of said regulation has been retained, it corresponds to an ethanol aqueous solution at 50% (v/v).

Each sheet is immersed in such a solution for 10 days at 40° C., at the end of which the styrene concentration is measured by gas chromatography coupled with mass spectrometry CG/MS.

The results are shown in Table 1 below.

TABLE 1

| | Formulations | | | | | | |
|---|---|---|---|---|---|---|---|
| Constituents | Control | F1 Invention | F2 Comparative | F3 Comparative | F4 Comparative | F5 Comparative | F6 Comparative |
| ① | — | 3 | — | — | — | — | — |
| ② | — | — | 3 | — | — | — | — |
| ③ | — | — | — | 3 | — | — | — |
| ④ | — | — | — | — | 3 | — | — |
| ⑤ | — | — | — | — | — | 3 | — |
| ⑥ | — | — | — | — | — | — | 3 |
| GPPS | 50 | 48.49 | 48.49 | 48.49 | 48.49 | 48.49 | 48.49 |
| HIPS | 50 | 48.49 | 48.49 | 48.49 | 48.49 | 48.49 | 48.49 |
| Antioxidant | — | 0.02 | 0.02 | 0.02 | 0.02 | 0.02 | 0.02 |
| Specific migration of styrene (ppm) | | | | | | | |
| | 0.066 | 0.006 | 0.060 | 0.078 | 0.059 | 0.078 | 0.078 |

It is observed that the formulation F1 allows reducing the migration by a ratio of more than 90% compared to the control formulation. It is also noticed that at equal concentrations three of the tested clays increase the migration of styrene compared to the control formulation. Among the comparative tests, only two clays have the capability of limiting the migration of styrene compared to the control formulation, yet the reduction rate does not exceed 10%.

Halloysite proves to be surprisingly effective.

The aforementioned document WO2004/012998A2 provides an illustration of the expected effect which seems to concern nanoparticles of any platy mineral filler. It arises from the present example that among various clays, halloysite is indeed the only one to have this capability of substantially reducing the migration of styrene.

Example 3

Two polystyrene formulations are prepared, one is a control formulation containing no clay and the other one according to the disclosure.

Control Formulation:

Commercial granules of crystal polystyrene (GPPS) of the Edistir® N 1840 type and high impact polystyrene (HIPS) of the Edistir® R 850 E type in a ratio of 50:50, are ground until obtaining a powder which is extruded at 200° C. into pellets using a twin-screw extruder of the TSA 21-40D type.

Formulation According to the Disclosure

Commercial granules of crystal polystyrene (GPPS) of the Edistir® N 1840 type are ground until obtaining a powder less than 5% of the particles of which are larger than 1,000 μm.

The used clay is a Dragonite HP halloysite. It is dried beforehand in a dryer for 2 hours at 120° C., and then added to ground GPPS in a proportion of 30% by weight relative to the weight of the mixture, as well as an antioxidant additive Irganox® 1076. The whole is then mixed for one minute at high speed in a turbo-mixer.

The powder mixture thus obtained is extruded at 190° C. into pellets using a twin-screw extruder of the TSA 21-40D type.

The pellets are then combined with a mixture having a weight ratio of 50/50 of crystal polystyrene (GPPS) of the Edistir® N 1840 type and high impact polystyrene (HIPS) of the Edistir® R 850 E type, to reach a final clay content of 3% by weight relative to the weight of the mixture.

Aliquots of 0.2 g of each of the formulations are sampled and dissolved in 8 ml of tetrahydrofuran. The samples are filtered and then analyzed by GC/MS in order to determine the volatile organic compounds not trapped by the clay.

The results are shown in Table 2 below.

TABLE 2

| | Formulations | |
|---|---|---|
| Constituents | Control | Disclosure |
| Halloysite (% w/w) | — | 3 |
| GPPS (% w/w) | 50 | 48.49 |
| HIPS (% w/w) | 50 | 48.49 |
| Antioxidant (% w/w) | — | 0.02 |
| Detected volatile organic compounds | | |
| Styrene monomer (ppm) | 846 | 112.9 |
| Styrene dimer (ppm) | 3288 | 815 |
| Styrene trimer (ppm) | 13465 | 293 |
| Styrene tetramer (ppm) | 340 | 4302 |

From these results, the following observations emerge:

Compared to the control formulation, a much lower content of styrene monomers, dimers and trimers is detected for a formulation of the disclosure, only the tetramers are in high proportion; this suggests that halloysite catalyzes the formation of oligomers of at least 4 units from styrene mono-, di- and tri-mers;

generally, that is to say including mono- and oligo-mers, a much lower rate of released styrene units, for a formulation of the disclosure, is measured; this indisputably demonstrates the positive effect of a halloysite by considerably reducing the degradation of polystyrene.

The invention claimed is:

1. A food packaging comprising a material for food packaging, the material comprising: a polystyrene and 0.1 to 50% by weight of a halloysite essentially in the form of empty nanotubes, relative to the weight of the material, wherein the polystyrene comprises styrene tetramer and optionally styrene monomer, styrene dimer and styrene trimer, the styrene tetramer weight content being higher than the styrene monomer content, and the styrene tetramer weight content being higher than the total weight content of styrene monomer+styrene dimer+styrene trimer.

2. The food packaging according to claim 1, wherein the food packaging is multilayer and comprises at least one layer made of the material comprising a polystyrene and 0.1 to 50% by weight of a halloysite essentially in the form of empty nanotubes, relative to the weight of the material.

3. The food packaging according to claim 2, wherein the food packaging comprises several layers, identical or different, made of the material comprising a polystyrene and 0.1 to 50% by weight of a halloysite essentially in the form of empty nanotubes, relative to the weight of the material.

4. A method for preparing a food packaging comprising preparing a polystyrene-based material for food packaging as defined in claim 1, the method for preparing the polystyrene-based material comprising a step of homogenizing wherein said material is a mixture of a polystyrene in particulate form and at least one halloysite essentially in the form of empty nanotubes is homogenized, to obtain said material, wherein the material comprises styrene tetramer and optionally styrene monomer, styrene dimer and styrene trimer, the styrene tetramer content being higher than the styrene monomer content, the styrene tetramer weight content being higher than the total weight content of styrene monomer+styrene dimer+styrene trimer.

5. The method according to claim 4, the method for preparing the polystyrene-based material including the following steps:

a) homogenizing a mixture of a polystyrene in particulate form and at least one halloysite essentially in the form of empty nanotubes to obtain a primary mixture, and b) homogenizing the primary mixture of step a) with a polystyrene in particulate form that is identical or different from the polystyrene in particulate form of step a) to obtain said material.

6. The method according to claim 5, wherein, before mixing with polystyrene the halloysite is dried.

7. The method according to claim 5, wherein at least one of the homogenizations is carried out in a twin screw extruder.

8. The method according to claim 4, wherein before the step of homogenizing the polystyrene is in the form of particles having a size smaller than or equal to 1 cm.

9. The food packaging according to claim 1, wherein in the material for food packaging, the polystyrene comprises styrene monomer, styrene dimer, styrene tetramer and the styrene tetramer content is higher than the sum of the styrene monomer and styrene dimer contents.

10. The food packaging according to claim 1, wherein in the material for food packaging, the polystyrene comprises styrene monomer, styrene dimer, styrene trimer styrene tetramer and the styrene tetramer content is higher than the sum of the styrene monomer, styrene dimer and styrene trimer contents.

11. The food packaging according to claim 1, wherein the material for food packaging further comprises at least one additive selected from the group consisting of antioxidants, colourants, pigments, and mineral fillers.

12. The method according to claim 4, wherein the homogenization step is carried out in a twin screw extruder.

* * * * *